METHOD OF CUTTING GLASS

Filed Oct. 7, 1968 2 Sheets-Sheet 1

EUGENE H. AUGUSTIN
GEORGE J. PAGAN
INVENTORS

BY

John R. Faulkner
William E. Johnson
ATTORNEYS

METHOD OF CUTTING GLASS
Filed Oct. 7, 1968 2 Sheets-Sheet 2
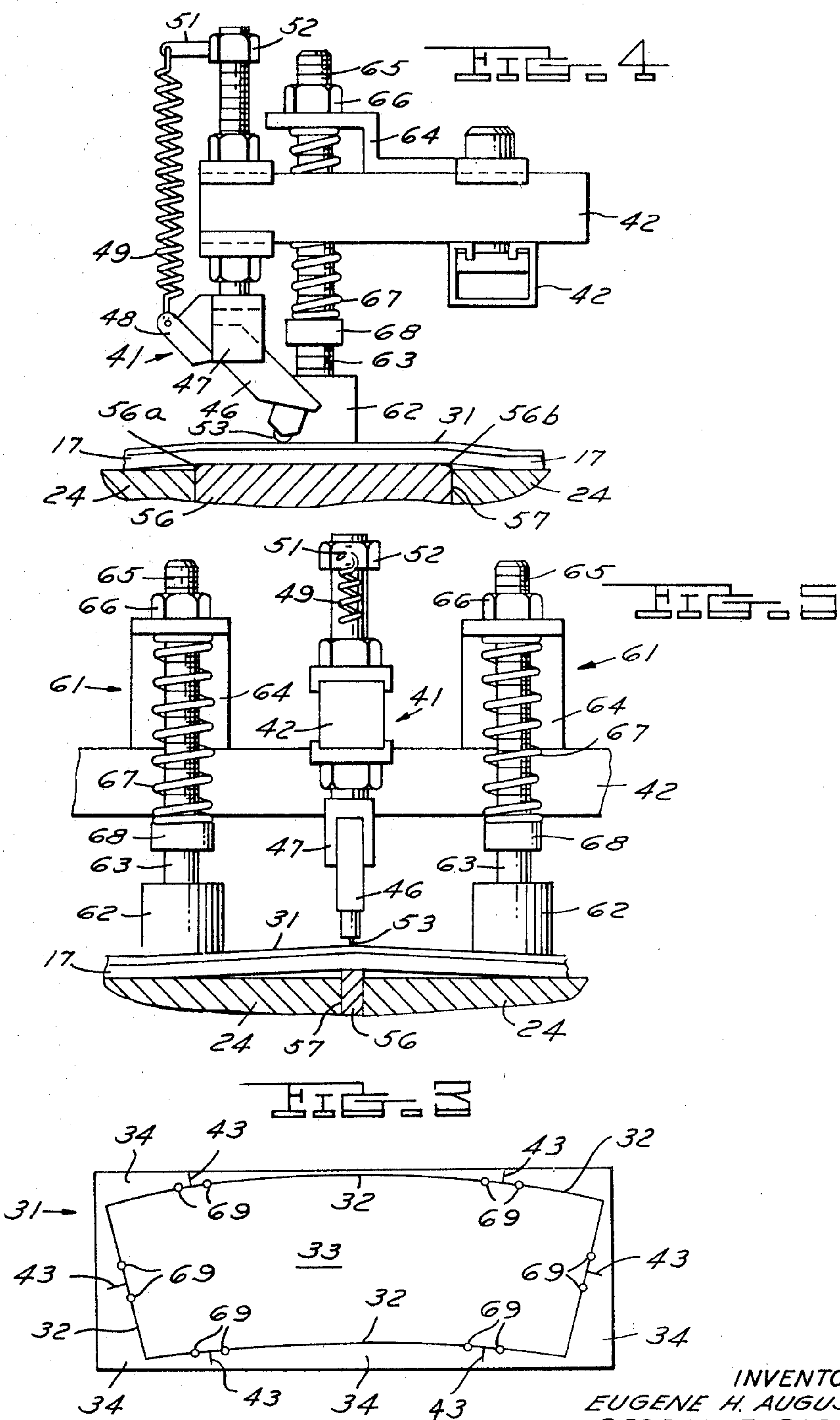
INVENTORS
EUGENE H. AUGUSTIN
GEORGE J. PAGAN
BY
John R. Faulkner
William E. Johnson
ATTORNEYS

United States Patent Office 3,520,456
Patented July 14, 1970

3,520,456

METHOD OF CUTTING GLASS

Eugene H. Augustin, Dearborn Heights, and George J. Pagan, Dearborn, Mich., assignors to Ford Motor Company, Dearborn, Mich., a corporation of Delaware Filed Oct. 7, 1968, Ser. No. 765,508
Int. Cl. B26f 3/00
U.S. Cl. 225—2 6 Claims

ABSTRACT OF THE DISCLOSURE

A method of cutting a glass template from a glass bracket and automatically separating the edge trim from the template has the following steps. A surface of the glass bracket is initially scored along a pattern to define the shape of a template to be cut from the bracket. The unscored surface of the bracket is positioned on the surface of a supporting medium with at least a portion of the scored surface of the bracket being in a reference plane. Pressure is applied across the initial score in a direction generally downward toward the supporting medium to run the initial score completely through the thickness of the glass. A secondary score is placed on the already scored surface of the glass bracket generally along a line from a marginal edge of the bracket toward the initial score. The scored surface of the glass bracket is raised upwardly from the reference plane along at least the line of the secondary score. The pressure applied across the initial score is maintained during the raising of the bracket thereby to run the secondary score from the marginal edge of the bracket to the initial score whereby the glass forming the edge trim of the bracket is separated from the glass template. Other embodiments of the method for separating the edge trim from the glass template are also set forth as well as an apparatus for performing the method.

BACKGROUND OF THE INVENTION

At the present time there is a known method of automatically cutting a glass template shape from a glass bracket. In one method, a template for a vehicle windshield is cut from a rectangular glass bracket. Briefly, this method comprises the steps of scoring a surface of the glass bracket along a pattern to define the template shape to be cut therefrom. The bracket is then positioned on the surface of a supporting medium. Pressure is applied across the score at points along the score overlying the supporting medium. The pressure applied at each point acts on the score in a direction toward the supporting medium and causes a running of the score through the thickness of the glass to complete the cutting of the glass along the pattern.

When the template shape scored in the glass is of closed configuration, such as for a windshield, sufficient pressure is applied on the score to cause a run-out of the score at the sharp corners of the template into the unscored area of the glass bracket between the score and the marginal edges of the bracket. This run-out of the score at the sharp corners provides a method of separating the edge trim of the original glass bracket from the glass template.

While this known method of cutting a glass template from a glass bracket is successful for separating the edge trim from the bracket, the pressure applied at the spaced points along the score is relatively high to achieve the run-out through the unscored portions of the glass bracket. Also, the run-out of the score at the sharp corners of the scored template sometimes results in the formation of minor defects at the corners of the template. These defects are in the form of chips or projections at the corners and it is necessary generally to polish these corners to obtain the desired finish thereon.

The method of this invention is designed to provide an automatic separation of the edge trim and glass template cut from a glass bracket. The method reduces the amount of pressure which must be applied on the score defining the template shape in order to cause a separation of the edge trim from the glass template. The method also reduces the number of occurrences of defects in the corners of the glass template which must be polished after the cutting of the template from the glass bracket.

SUMMARY OF THE INVENTION

This invention relates to a method of cutting glass and, more particularly, to a method of cutting a glass template from a glass bracket and of separating the edge trim of the bracket from the glass template during the formation of the glass template.

The glass cutting method of this invention has at least the following steps. A glass bracket is initially scored on a surface thereof along a pattern to define the shape of a glass template to be cut from the bracket. The unscored surface of the glass bracket is positioned on a supporting medium with at least a portion of the scored surface of the bracket being in a reference plane. Pressure is applied on the initial score defining the template, the pressure being applied in a direction generally downward on the score toward the supporting medium. The pressure acts on the score to run the initial score completely through the thickness of the glass to cut the glass template from the glass bracket. The glass bracket is then secondarily scored generally along a line from the marginal edge of the bracket toward the initial score on the bracket. The scored surface of the glass bracket is raised upwardly from the reference plane along the line of the secondary score placed thereon while the pressure is maintained across the initial score. The raising of the glass causes the secondary score to run from the marginal edge of the bracket to the initial score whereby the glass forming the edge trim of the bracket is separated from the glass template.

In an alternate embodiment of the method of this invention, the glass bracket may have the secondary score placed thereon prior to the application of pressure to the initial score. In this case the raising of the glass bracket upwardly from the reference plane does not occur until after the initial score has been run. In another embodiment the glass bracket is raised upwardly from the reference plane prior to the running of the initial score. Once the initial score has been run, the secondary scores are placed on the raised portion of the glass bracket to effect a separation of the edge trim from the glass template.

In greater detail the method of this invention is applied to cut a glass template from a glass bracket which is defined on the bracket by a score of closed configuration. In this situation the glass bracket is raised from the reference plane in at least two positions which are preferably on opposite sides of the glass bracket so that the edge trim comes from the cutting operation in at least two pieces.

BRIEF DESCRIPTION OF THE DRAWINGS

FIG. 3 is a plan view of a glass bracket scored to define a glass template shape therein. FIG. 4 is a side elevational view of a portion of one of the apparatus of FIGS. 1 and 2 which place a secondary score on the glass bracket.

FIG. 5 is an end elevational view of the apparatus shown in FIG. 4.

DESCRIPTION OF THE PREFERRED EMBODIMENT

General

The overall description of the detailed method of this invention includes the cutting and stripping of a glass template from a glass bracket. This detailed method will be described in conjunction with FIGS. 1 and 2 of the drawings. When a glass template is cut from a glass bracket, the material to be separated from the glass template after the cutting operation is referred to as the edge trim.

Figure 1:
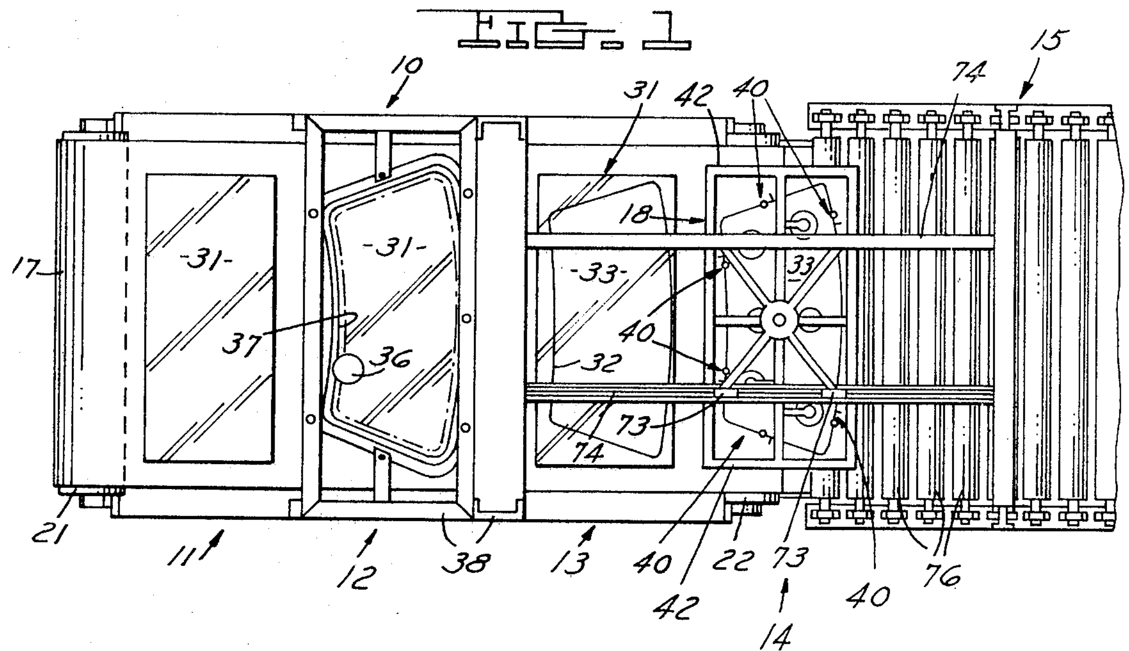
FIG. 1 is a plan view of apparatus capable of performing the method of this invention in which a glass template is cut and stripped from a glass bracket.
Figure 2:
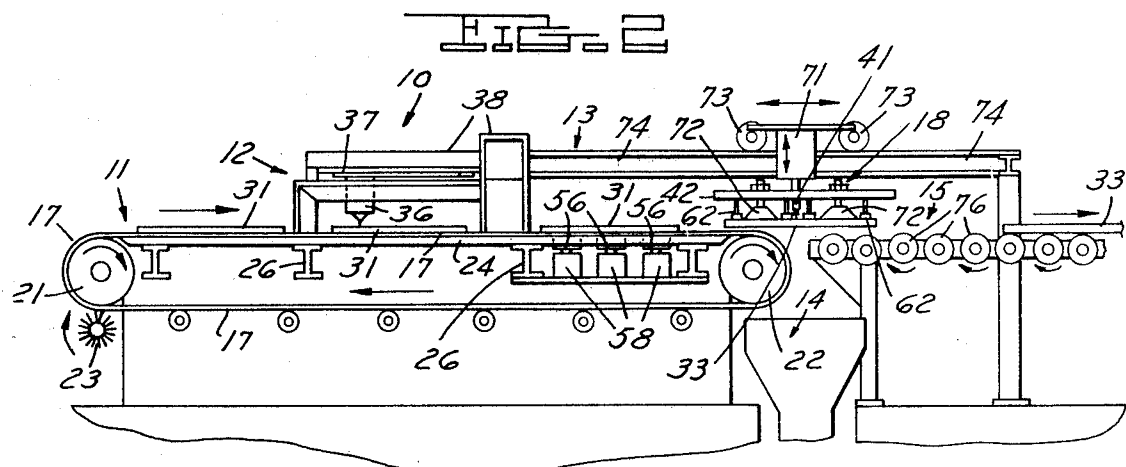
FIG. 2 is an elevational view of the apparatus of FIG. 1.

In FIGS. 1 and 2, there is shown a glass cutting and stripping machine generally designated by the numeral 10. This machine has a glass loading station 11, a glass scoring station 12, a glass stripping and edge trim removing station 13, a glass disposal station 14, and a template unloading station 15. An endless belt 17 and a movable stripping and lifting device 18 interconnects the various stations of the machine 10 in a manner which will be described below.

The endless belt 17, which is formed of a yieldable material such as hard rubber, is indexed around a pair of pulleys 21 and 22 by a suitable indexing mechanism which is conventional and not shown. Disposed below the pulley 21 is a rotary brush 23 which brushes the endless belt to remove any glass particles which remain thereon after the belt has moved through the machine.

Upon each index of the belt 17, a portion thereof is presented to the glass loading station 11. At this station and at the next two adjacent stations, the endless belt is supported on a metal plate 24 which in turn is supported by structural members 26. At the loading station a glass bracket 31 is placed on the belt by an operator or by a mechanical handling apparatus which is conventional and not shown.

The next index of the belt 17 causes advancement of the glass bracket 31 from the loading station 11 to the glass scoring station 12. At the glass scoring station, a glass scoring tool 36 is actuated and brought into engagement with the surface of the glass bracket not engaging the belt. The glass scoring tool is moved about a tool guide track 37 while the scoring tool is in engagement with the top surface of the bracket. This action places a score 32 (see FIG. 3) on the glass bracket 31 to define a glass template shape 33 on the surface thereof. The score 32 is in the form of a plurality of fissures in the glass which do not go completely through the thickness of the glass. The scored surface of the glass bracket is substantially in a single plane and this plane provides a reference plane. The glass scoring tool and the tool guide track are supported above the endless belt 17 by structural members 38 secured to the structural members 26. The tool and track are of standard construction and no further description thereof will be contained herein.

The next index of the endless belt 17 moves the scored glass bracket 31 to the glass stripping and edge trim removing station 13. At this station the movable glass stripping and lifting device 18 is utilized (1) to place secondary scores on the blass bracket, (2) to cut the glass template 33 from the bracket and (3) to remove the template from the edge trim.

The new and novel glass cutting method of this invention is best appreciated by reference to FIGS. 4 and 5 of the attached drawings. In FIGS. 4 and 5 there is shown the additional apparatus which places secondary scores on the glass bracket 31 to permit subsequent separation and easy removal of the glass template 33 from edge trim 34 remaining after the cutting of the bracket. One of the secondary scoring apparatus is shown in FIGS. 4 and 5 and generally designated by the numeral 41. The apparatus is affixed to frame members 42 of the stripping and lifting device 18. In the preferred embodiment, wherein a windshield is formed by the glass template 33, six of the secondary scoring apparatus 41 are utilized about the periphery of the score 32. The location of the six apparatus on the device 18 is designated by the numeral 40 in FIG. 1. Also, these apparatus place secondary scores 43 in the six positions designated in FIG. 3. Since each of the secondary scores is placed on the glass bracket 31 in the same manner, only the operation of a single apparatus will be described in detail.

Each secondary scoring apparatus 41 has a member 46 attached for pivotable movement to a block 47 secured to the frame member 42. The member 46 has an upwardly extending portion 48 thereof which has one end of a spring 49 attached thereto. The other end of the spring is attached to a member 51 associated with an adjustable bolt 52, which bolt is, in turn, secured to the frame member 42. The pivotable member 46 also supports on the lower portion thereof a cutter wheel 53, the cutter wheel being of such a type that when moved across the surface of the glass bracket 31, it will produce a secondary score in the glass bracket. This score is formed as a plurality of fissures in the glass which do not extend through to the bottom surface of the bracket.

The glass bracket 31 has most of the upper surface thereof in a reference plane when the bracket 31 is scored at the scoring station 12. When the glass bracket is indexed to the stripping and edge trim removing station 13, areas of the upper surface of the glass bracket 31 underlying each of the six secondary scoring apparatus 41 may be raised upwardly from the reference plane by means of movable cam strips 56 provided at each one of the six locations. These cam strips have tapered front and back surfaces **56*a* and 56*b* (see FIG. 4). The cam strips are movable up and down through openings 57 in the metal plate 24 at the station 13 by vacuum motors 58** (see FIG. 2). In a retracted position the strips do not engage the bottom surface of the glass bracket. In an advanced position, the strips engage the glass to move some portions of the scored surface upwardly from the reference plane.

As best seen in FIGS. 4 and 5, a pair of pressure applying members, generally designated by the numeral 61, are mounted on opposite sides of the secondary scoring apparatus 41. Each pressure applying member 61 has a pressure pad portion 62 on the lower end thereof formed of a semi-rigid material such as neoprene rubber or heavy felt and having a diameter of about 1¼ inches. The pressure pad portion is secured to a shaft 63 extending upwardly through an opening, not shown, in a mounting bracket 64 to an upper terminal portion 65 which has a nut 66 threadingly engaging the same. A spring 67 acts between the underside of the bracket 64 and a collar 68 attached to the shaft 63 adjacent the pressure pad portion 62 of the pressure applying member 61.

The mounting bracket 64 is attached to the frame members 42 of the stripping and lifting device 18. The individual ones of the pressure applying members 61 apply pressure on the score 32 placed on the glass template 31 at the points indicated by the reference numeral 69 in FIG. 3. As best seen in that figure, the points of application of the pressure on the initial score 32 act across the score 32. Also, each pair of pressure points act on either side of the secondary score 43 placed on the glass surface by the secondary scoring apparatus 41.

Operation

In operation, as previously described, the glass bracket 31 is scored at the glass scoring station 12 so that the glass template shape 33 is defined therein. The glass bracket 31 is thereafter indexed on the belt 17 to the glass stripping and edge trim removing station 13. Upon index, portions of the glass bracket are brought to positions underlying each of the six secondary scoring apparatus 41 mounted on the stripping and lifting device 18. The stripping and lifting device is then moved to its leftmost position as viewed in FIG. 2 and will, in that left position, overlie the glass template at the station 13. When in this leftmost position, an air cylinder 71 of the device is actuated so as to move the frame members 42 of the device generally downward toward the glass bracket 31 located therebelow.

In accordance with one embodiment of the method of this invention, downward movement of the frame members 42 toward a lower, terminal position of the stripping and lifting device 18 brings the pressure pad portion 62 of each of the pressure applying members 61 into engagement with the score 32 at the points indicated by the numeral 69 in FIG. 3. The application of pressure at the six pairs of points 69 places the unscored surface in tension and causes a complete running of the fissures defined by the score 32 down through the unscored surface of the glass whereby the glass template 33 is cut from the bracket 31. The amount of pressure applied at each point is approximately 12 pounds of force for ⅛ inch thickness glass and this pressure is generally not sufficient to run-out the score through the unscored glass area between the initial score and lateral edges of the glass bracket.

The springs 67 of the pressure applying members 61 continue to cause force to be exerted on the glass bracket during further downward movement of the stripping and lifting device 18. During downward movement of the frame members 42 of the device 18 which causes a running of the score 32, each of the cutter wheels 53 is brought into contact with the glass bracket at selected positions which overlie individual ones of the cam strips 56. The continued downward movement of the frame members 42 then causes each of the cutter wheels 53 to move along the surface of the glass bracket as the member 46 pivots in a direction against bias of the spring 49. This cutter movement places a secondary score 43 on the glass bracket 31 at each of the locations graphically depicted in FIG. 3.

After the secondary scores are placed to a sufficient length on the bracket 31, the vacuum motors 58 are actuated by standard apparatus, not shown. Operation of the motors 58 moves the cam strips 57 associated therewith from their retracted position to an advanced position such as depicted in FIGS. 4 and 5. This movement of the cam strips causes upward movement of the scored glass surface from its reference plane by a distance of about 0.060 inch. During this movement of the glass, the application of the pressure at the points 69 spaced on either side of each of the secondary scores 43 also causes a flexing of the glass in the vicinity of the secondary scores. This flexing or bending action causes each of the secondary scores 43 to be run from the outer edges of the glass ribbon to the initial score 32. This action separates the edge trim pieces 34 from the glass template 33. In this particular case, six pieces of edge trim are generated and, in turn, are separated easily from the glass template.

The cutting and running of the scores is thus completed during the downward movement of the frame members 42 of the stripping and lifting device 18. Also during this downward movement of the device, spring loaded suction cups 72, best seen in FIG. 2, are brought into engagement with the upper surface of the bracket prior to either the scoring or the application of pressure on the glass. Since these suction cups are spring loaded, they yield during the downward movement of the frame members 42 to their terminal position. When the air cylinder 71 is reversed, the spring loaded suction cups 72 pick up the glass template 33 from the belt 17 leaving behind the pieces of edge trim 34.

The stripping and lifting device 18, now supporting the glass template 33, is moved on wheels 73 over tracks 74 to a position whereat the glass template 33 will overlie the unloading station 15, At this position the air cylinder 71 is actuated in a downward direction and thus deposits the template on a plurality of rollers 76 at the unloading station.

The endless belt 17 is now indexed to deposit the edge trim 34 in a hopper at the glass disposal station 14. This index of the belt 17 brings a new glass bracket 31 to the glass scoring station 12 and a scored glass bracket to the stripping and edge trim removing station 13 so that another cycle of operation may be commenced.

In accordance with a second embodiment of the method of this invention, the relative position of the secondary scoring apparatus 41 and the pressure applying members 61 are adjusted so that the secondary scores are placed on the bracket prior to the running of the initial score. In this case the cam strips 56 are not moved upwardly to flex the glass until after the initial score has been run. If the secondary scores are run prior to the running of the initial score, the glass template 33 may be damaged by running of the secondary scores into the area of the glass template.

In accordance with still another embodiment of the method of this invention, the glass bracket is engaged and moved upwardly from the reference plane prior to the running of the initial score. In this case the secondary scores are placed on the bracket only after the initial score has been run. Also, in this case the secondary score need only be approximately ⅛ inch long to cause the continued application of pressure to the points 69 to run the secondary scores from the lateral edges of the ribbon to the initial score.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. In a method of cutting glass wherein a glass bracket is initially scored on one surface thereof along a pattern to define the shape of a template to be cut from the bracket, and wherein the glass bracket is positioned with its unscored surface on a supporting medium, at least a portion of the scored surface of the bracket being in a reference plane, the improvement comprising:

applying pressure across the initial score defining the shape of the template on the glass bracket, the pressure being directed generally downward on the score and acting thereon to run the initial score completely through the thickness of the glass to cut the glass template from the glass bracket;

secondarily scoring the glass bracket generally along a line from a marginal edge of the bracket toward the initial score on the bracket; and raising the glass bracket upwardly from the reference plane generally along the line of the secondary score placed thereon while maintaining the pressure applied across the initial score thereby to run the secondary score from the marginal edge of the bracket to the initial score whereby the glass forming the edge trim of the bracket is separated from the glass template.

2. The method of cutting glass as specified in claim 1 wherein the secondary score is placed on the glass bracket prior to the applying of pressure to the initial score; and wherein the pressure is applied to the initial score prior to raising of the glass bracket upwardly from the reference plane.

3. The method of cutting glass as specified in claim 1 wherein the glass bracket is raised upwardly from the reference plane along a line from the marginal edge to the initial score prior to the applying of pressure on the initial score of the bracket; and wherein the pressure is applied to the initial score to run the initial score completely through the glass prior to the secondary scoring of the glass along the raised line whereby the secondary scoring, in conjunction with the continued application of pressure to the initial score, causes the running of the score from the marginal edge of the glass bracket to the initial score.

4. The method of cutting glass as defined in claim 1, 2 or 3 wherein the pressure applied to the initial score is applied at points positioned on both sides of the line along the glass bracket raised from the reference plane.

5. The method of cutting glass as defined in claim 1, 2 or 3 wherein the template shape defined in the glass bracket is of closed configuration; wherein the glass bracket is raised from the reference plane and secondarily scored at a plurality of positions; and wherein pressure is applied across the initial score adjacent the plurality of raised positions.

6. The method of cutting glass as defined in claim 4 wherein the template shape defined in the glass bracket is of closed configuration; wherein the glass bracket is raised from the reference plane and scored at a plurality of positions; and wherein pressure is applied across the initial score adjacent the plurality of raised positions.

References Cited

UNITED STATES PATENTS

| | | | |
|---|---|---|---|
| 1,887,564 | 11/1932 | Sherts | 225—2 |
| 2,508,017 | 5/1950 | Echter et al. | 225—2 |
| 3,372,847 | 3/1968 | Walters et al. | 225—96.5 X |

FRANK T. YOST, Primary Examiner

U.S. Cl. X.R.

225—96.5, 97